(12) United States Patent
Liang

(10) Patent No.: US 11,820,024 B2
(45) Date of Patent: Nov. 21, 2023

(54) COORDINATE SYSTEM CALIBRATION METHOD, DEVICE, AND COMPUTER READABLE MEDIUM

(71) Applicant: Siemens Ltd., China, Beijing (CN)

(72) Inventor: Dong Liang, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 52 days.

(21) Appl. No.: 17/617,673

(22) PCT Filed: Jun. 17, 2019

(86) PCT No.: PCT/CN2019/091575
§ 371 (c)(1),
(2) Date: Dec. 9, 2021

(87) PCT Pub. No.: WO2020/252632
PCT Pub. Date: Dec. 24, 2020

(65) Prior Publication Data
US 2022/0168896 A1    Jun. 2, 2022

(51) Int. Cl.
*B25J 9/16* (2006.01)
(52) U.S. Cl.
CPC .......... *B25J 9/1692* (2013.01); *B25J 9/1697* (2013.01)
(58) Field of Classification Search
CPC .................. B25J 9/1692; B25J 9/1697; G05B 2219/39024; G05B 2219/39057
See application file for complete search history.

(56) References Cited

U.S. PATENT DOCUMENTS 5,471,312 A * 11/1995 Watanabe .............. B25J 9/1692
347/256
10,576,635 B2 * 3/2020 Ogawa ................... B25J 19/023
(Continued)

FOREIGN PATENT DOCUMENTS

CN    101807247 A    8/2010
CN    102289824 A    12/2011
(Continued)

OTHER PUBLICATIONS

Tsai Roger Y. et al.; "A New Technique for Fully Autonomous and Efficient 3D Robotics Hand/Eye Calibration"; IEEE Transaction on Robotics and Automation; IEEE Inc, New York, US; vol. 5; No. 3; pp. 345-358; ISSN: 1042-296X; DOI: 10.1109/70.34770; XP000028733;; 1989.

*Primary Examiner* — Robert T Nguyen
(74) *Attorney, Agent, or Firm* — Harness, Dickey & Pierce, P.L.C.

(57) ABSTRACT

The invention relates to the technical field of industrial robots, and particularly relates to a coordinate system calibration method, a device, and a computer readable medium. A coordinate calibration method comprising: rotating an actuator (20) about an z" axis of an actual actuator coordinate system (63) to reach three different positions, and controlling a camera (10) to capture an image of a target object (60) on an operation platform (40) for each of the three reached positions; merging positions of the target object (60) in images captured at the three positions into one image, and determining coordinates of a center P3 of a circumcircle of the three positions of the target object (60) in the image under a camera coordinate system (62); enabling the actuator (20) to move along the z" axis and contact the operation platform (40) with a terminal end, and labeling a contact point as a point P2; controlling the actuator (20) to return to a first position (71) along the z"

(Continued)

axis, and controlling the camera (10) to capture an image; determining coordinates of P2 under the camera coordinate system (62) according to the position of P2 in the image; and determining, according to the coordinates of P2 and P3 under the camera coordinate system (62) and a moved distance of the actuator (20) from the first position (71) along the z″ axis, a deviation of the z″ axis from a theoretical z axis of an actuator coordinate system (61). The invention has an advantage of operational simplicity.

9 Claims, 6 Drawing Sheets

(56) References Cited

U.S. PATENT DOCUMENTS

| | | | |
|---|---|---|---|
| 11,247,340 B2* | 2/2022 | Hsu | ........................ B25J 9/1697 |
| 2013/0010081 A1 | 1/2013 | Biro et al. | |
| 2014/0088765 A1 | 3/2014 | Lukka et al. | |

FOREIGN PATENT DOCUMENTS

| | | | |
|---|---|---|---|
| CN | 104354167 A | 2/2015 | |
| CN | 106291278 A | 1/2017 | |
| CN | 106426172 A | 2/2017 | |
| CN | 107160380 A | 9/2017 | |
| CN | 107813313 A | 3/2018 | |
| CN | 108942927 A | 12/2018 | |
| CN | 109754421 A | 5/2019 | |

\* cited by examiner

COORDINATE SYSTEM CALIBRATION METHOD, DEVICE, AND COMPUTER READABLE MEDIUM

PRIORITY STATEMENT

This application is the national phase under 35 U.S.C. § 371 of PCT International Application No. PCT/CN2019/091575 which has an International filing date of Jun. 17, 2019, which designated the United States of America, the entire contents of each of which are hereby incorporated herein by reference.

FIELD

Embodiments of the present invention generally relate to the technical field of industrial robots, and in particular, to a method and an apparatus for calibrating a coordinate system, and a computer-readable medium.

BACKGROUND

An "eye on hand" robot has a camera (eye) mounted on an effector (hand, such as a gripper) connected to a robotic arm, rather than mounted beside the robot. To achieve coordination between the camera and the effector in an automatic process of performing an operation, it is required to determine a transformation relationship between an effector coordinate system and a camera coordinate system, that is, to perform hand-eye calibration.

FIG. 1 shows an existing method for hand-eye calibration. In this method, a user 30 controls a robotic arm 21 to pass various points on a workbench 40 along a specified path, and controls, as the robotic arm 21 moves, a camera 10 to photograph a target object 60 on the workbench 40. Then, a transformation relationship between two coordinate systems is determined based on positions of an effector 20 and coordinates of the target object 60 recorded by photographing in a moving process of the robotic arm 21.

At present, an assumed precondition for applying the hand-eye calibration method is that a z-axis of an effector coordinate system is perpendicular to the workbench 40. If the precondition is not satisfied, an error occurs.

SUMMARY

Embodiments of the present invention provide a method and an apparatus for calibrating a coordinate system, and a computer-readable medium, to determine an error caused by non-perpendicularity of a z-axis of an effector coordinate system to a workbench.

According to a first embodiment, a method for calibrating a coordinate system is provided. The method may include: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

According to a second embodiment, an apparatus for calibrating a coordinate system is provided, the apparatus including: a control module configured to: when an effector fixedly connected to a robotic arm is at a first position, a second position, and a third position, separately control a camera fixedly connected to the effector to photograph a target object placed on a workbench operated by the robotic arm, where the second position and the third position are two positions to which the effector rotates, from the first position, around a z"-axis of an actual effector coordinate system; a photograph processing module configured to: merge positions of the target object in photographs taken when the effector is at the second position and the third position into a photograph taken when the effector is at the first position; a calculation module configured to: determine coordinates, in a camera coordinate system, of the center P3 of a circle in which the three positions of the target object in the photograph with the merged positions are located; the control module further configured to: control the robotic arm to make the effector move along the z"-axis until the end of the effector touches the workbench, mark a point at which the effector touches the workbench as a point P2, and control the robotic arm to make the effector return to the first position along the z"-axis and control the camera to photograph; and the calculation module further configured to: determine coordinates of P2 in the camera coordinate system based on a position of P2 in a photograph, and determine a degree of deviation of the z"-axis from a z-axis of a theoretical effector coordinate system based on the coordinates of P2 and P3 in the camera coordinate system and a distance for which the effector moves from the first position along the z"-axis.

According to a third embodiment, an apparatus for calibrating a coordinate system is provided, the apparatus including: at least one memory configured to store computer-readable code; and at least one processor configured to invoke the computer-readable code to perform the following steps: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

According to a fourth embodiment, a computer-readable medium is provided, where the computer-readable medium stores thereon computer-readable instructions that, when executed by a processor, cause the processor to perform the following steps: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

LIST OF REFERENCE NUMERALS

Figure 1:
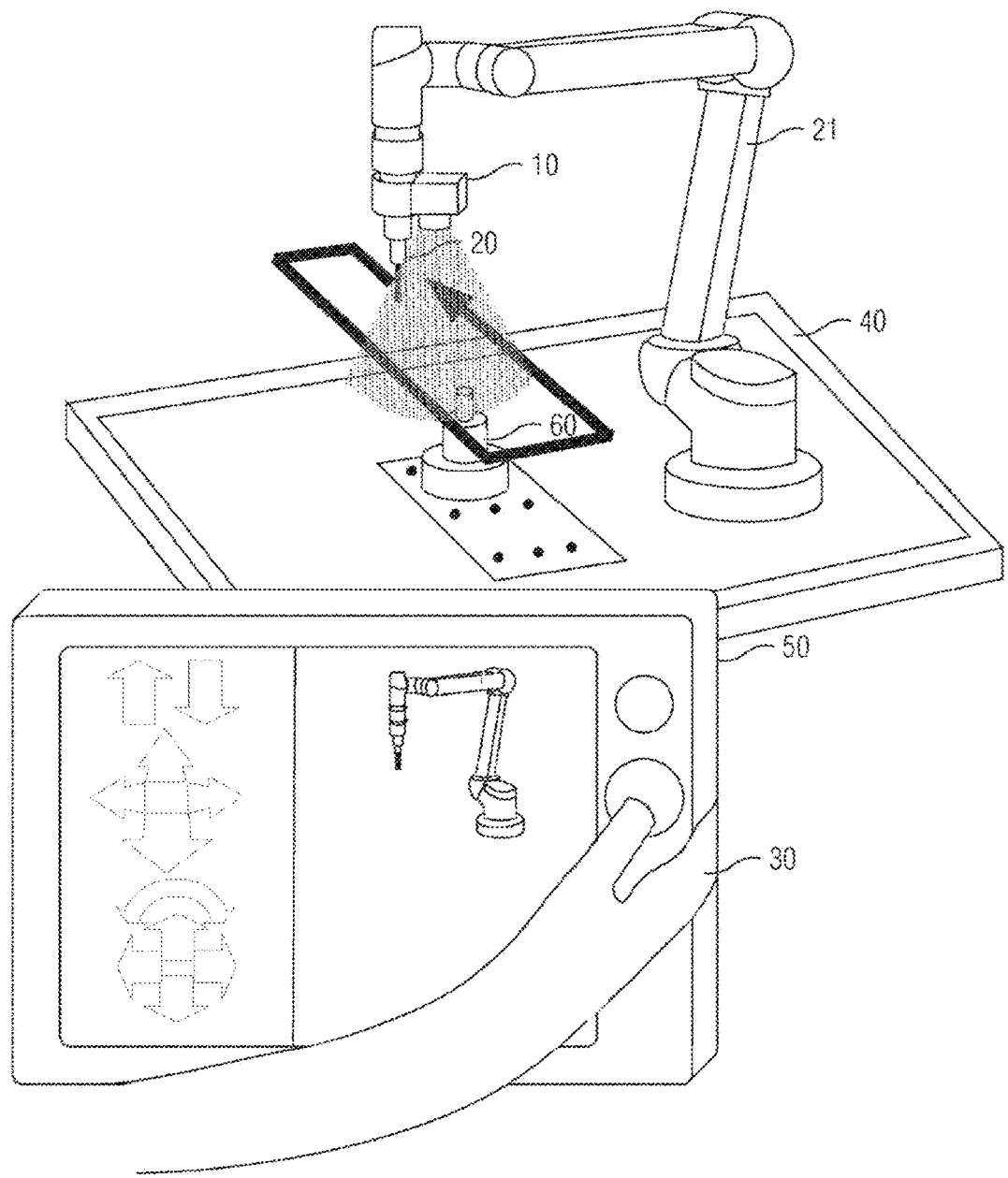
FIG. 1 shows a method for hand-eye calibration.

| | | |
|---|---|---|
| 10: Camera | 20: Effector | 21: Robotic arm |
| 30: User | 40: Workbench | 50: Teach pendant |
| 60: Target object | 61: Theoretical effector coordinate system | 62: Camera coordinate system |
| 63: Actual effector coordinate system | 100: Apparatus for calibrating a coordinate system | |
| 71: First position | 72: Second position | 73: Third position |
| 74: Fourth position | 81, 81'', 81'': Positions of the camera 10 in photographs | |
| 82, 82', 82'': Positions of the target object 60 in the photographs | | 83: Position of P3 in the photographs |
| 84, 84', 84'': Field of view of the camera | | 85, 85', 85'': Positions of P2 in the photographs |
| S901 to S910: Method steps | 1001: Control module | 1002: Photograph processing module |
| 1003: Calculation module | 1004: Memory | 1005: Processor |

DETAILED DESCRIPTION OF EXAMPLE EMBODIMENTS

According to a first embodiment, a method for calibrating a coordinate system is provided. The method may include: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

According to a second embodiment, an apparatus for calibrating a coordinate system is provided, the apparatus including: a control module configured to: when an effector fixedly connected to a robotic arm is at a first position, a second position, and a third position, separately control a camera fixedly connected to the effector to photograph a target object placed on a workbench operated by the robotic arm, where the second position and the third position are two positions to which the effector rotates, from the first position, around a z"-axis of an actual effector coordinate system; a photograph processing module configured to: merge positions of the target object in photographs taken when the effector is at the second position and the third position into a photograph taken when the effector is at the first position; a calculation module configured to: determine coordinates, in a camera coordinate system, of the center P3 of a circle in which the three positions of the target object in the photograph with the merged positions are located; the control module further configured to: control the robotic arm to make the effector move along the z"-axis until the end of the effector touches the workbench, mark a point at which the effector touches the workbench as a point P2, and control the robotic arm to make the effector return to the first position along the z"-axis and control the camera to photograph; and the calculation module further configured to: determine coordinates of P2 in the camera coordinate system based on a position of P2 in a photograph, and determine a degree of deviation of the z"-axis from a z-axis of a theoretical effector coordinate system based on the coordinates of P2 and P3 in the camera coordinate system and a distance for which the effector moves from the first position along the z"-axis.

According to a third embodiment, an apparatus for calibrating a coordinate system is provided, the apparatus including: at least one memory configured to store computer-readable code; and at least one processor configured to invoke the computer-readable code to perform the following steps: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

According to a fourth embodiment, a computer-readable medium is provided, where the computer-readable medium stores thereon computer-readable instructions that, when executed by a processor, cause the processor to perform the following steps: when an effector fixedly connected to a robotic arm is at a first position, a second position, and a third position, separately controlling a camera fixedly connected to the effector to photograph a target object placed on a workbench operated by the robotic arm, where the second position and the third position are two positions to which the effector rotates, from the first position, around a z"-axis of an actual effector coordinate system; merging positions of the target object in photographs taken when the effector is at the second position and the third position into a photograph taken when the effector is at the first position; determining coordinates, in a camera coordinate system, of the center P3 of a circle in which the three positions of the target object in the photograph with the merged positions are located; controlling the robotic arm to make the effector move along the z"-axis until the end of the effector touches the workbench, and marking a point at which the effector touches the workbench as a point P2; controlling the robotic arm to make the effector return to the first position along the z"-axis and controlling the camera to photograph; determining coordinates of P2 in the camera coordinate system based on a position of P2 in a photograph; and determining a degree of deviation of the z"-axis from a z-axis of a theoretical effector coordinate system based on the coordinates of P2 and P3 in the camera coordinate system and a distance for which the effector moves from the first position along the z"-axis.

The foregoing solution features simple and easy operation and high efficiency, and an error can be accurately and effectively determined. The robotic arm is controlled to move and rotate only for a limited number of times, and there is no need to control a distance and an angle of movement of the effector precisely. This means easier operation and no need to set a great number of parameters, and thus lowers requirements on an operator.

For any of the foregoing embodiments, optionally, coordinates of P2 in the theoretical effector coordinate system may further be determined, and a deviation direction of the z"-axis is obtained via calculation based on the determined coordinates.

For any of the foregoing embodiments, optionally, coordinates of an operation position in the camera coordinate system may further be determined; the coordinates of the operation position in the camera coordinate system are transformed into coordinates in the theoretical effector coordinate system; and coordinates of the operation position in the actual effector coordinate system are determined based on the degree of deviation of the z"-axis from the z-axis, the deviation direction of the z"-axis, and the coordinates of the operation position in the theoretical effector coordinate system. The accurate operation position in the actual effector coordinate system is determined based on the error, so that accuracy of operation of the effector can be ensured.

The subject matter described herein are now discussed with reference to example implementations. It should be understood that the discussion of these implementations is merely intended to help a person skilled in the art to better understand and implement the subject matter described herein, but not to limit the protection scope, applicability or examples set forth in the claims. The functions and arrangement of the discussed elements can be changed without departing from the protection scope of the present disclosure. Various processes or components may be omitted, replaced, or added in various examples as required. For example, the described method may be performed in an order different from the one described, and the steps may be added, omitted, or combined. In addition, the features described in terms of some examples can also be combined in other examples.

As used herein, the term "include" and variants thereof represent an open term, which means "including but not limited to". The term "based on" represents "at least partially based on". The terms "an embodiment" and "the embodiment" represent "at least one embodiment". The term "another embodiment" represents "at least one another embodiment". The terms "first", "second", and the like may refer to different or the same objects. Other definitions, whether explicit or implicit, can be included below. Unless expressly specified in the context, the definition of a term is consistent throughout the description.

Figure 2:
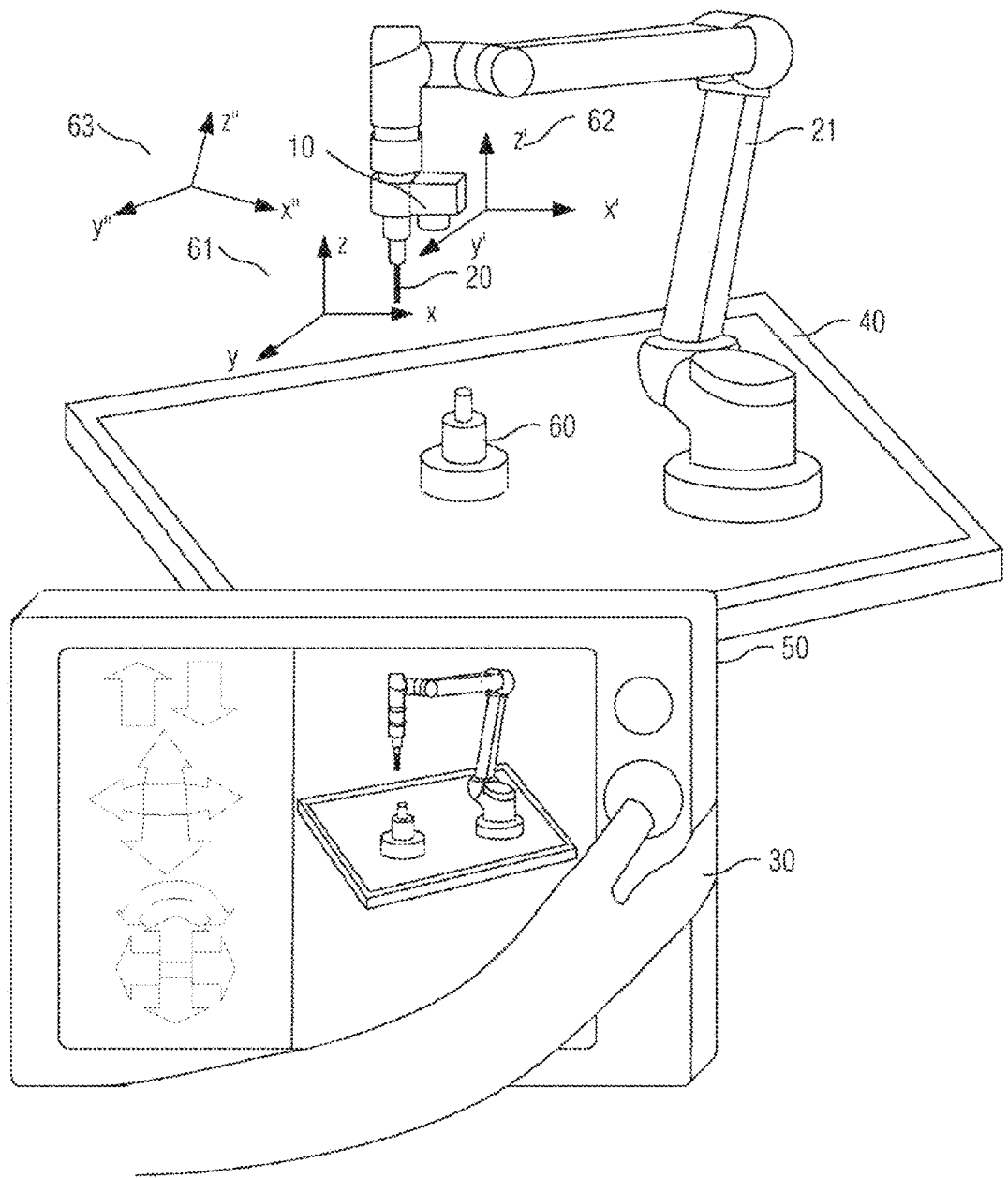
FIG. 2 shows a scenario in which a robotic arm is controlled to move and photograph, and a camera coordinate system, a theoretical effector coordinate system, and an actual effector coordinate system according to an embodiment of the present invention.

As shown in FIG. 2, in this embodiment of the present invention, a camera 10 is mounted on an effector 20 of a robotic arm 21. A user 30 can use a teach pendant 50 to control movement of the robotic arm 21, to cause the effector 20 to operate on a workbench 40. A target object 60 is placed on the workbench 40, and the target object 60 is within a range of photographing of the camera 10. Three axes of a theoretical effector coordinate system 61 are an x-axis, a y-axis, and a z-axis. Three axes of a camera coordinate system 62 are an x'-axis, a y'-axis, and a z'-axis. Three axes of an actual effector coordinate system 63 are an x"-axis, a y"-axis, and a z"-axis.

Figure 3:
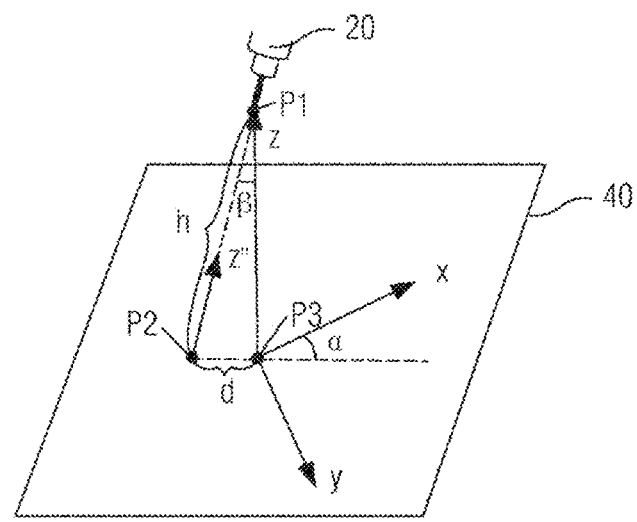
FIG. 3 shows two error parameters to be solved according to an embodiment of the present invention.

In FIG. 2, the z-axis of the theoretical effector coordinate system 61 is perpendicular to the workbench 40, but the z"-axis of the actual effector coordinate system 63 is not perpendicular to the workbench 40, which causes errors α and β shown in FIG. 3. In FIG. 3, a point P1 is a position of the end of the effector 20 (which usually is a position of a TCP of the effector 20) in space, a point P2 is a point at which the end of the effector 20 touches the workbench 40 when the effector 20 moves from a position shown in FIG. 3 along the z"-axis of the actual effector coordinate system 61, and a point P3 is a point at which the end of the effector 20 touches the workbench 40 when the effector 20 moves from the position shown in FIG. 3 along the z-axis of the theoretical effector coordinate system 61, that is, a projection of P1 on the workbench 40.

As shown in FIG. 2, β is an angle between the z"-axis of the actual effector coordinate system 63 and the z-axis of the theoretical effector coordinate system 61, and α is a counter-clockwise angle between a projection of the z"-axis of the actual effector coordinate system 63 on a plane of the workbench 40, namely a vector $\overrightarrow{P2P3}$, and the x-axis of the theoretical effector coordinate system 61, and is used to indicate a deviation direction of the z"-axis. The direction is represented by the angle between the projection of the z"-axis on the plane of the workbench 40 and the x-axis. In specific implementation, the direction may alternatively be represented by an angle between the projection of the z"-axis on the plane of the workbench 40 and the y-axis or in another manner. In this embodiment of the present invention, β may be calculated according to sin β=d/h by obtaining d and h shown in FIG. 3.

In this embodiment of the present invention, assuming that a transformation relationship between the theoretical effector coordinate system 61 and the camera coordinate system 62 is known, for any coordinates in the theoretical effector coordinate system 61, coordinates in the camera coordinate system 62 can be obtained according to the transformation relationship.

In this embodiment of the present invention, the robotic arm 21 is controlled to move, which causes the effector 20 connected to the robotic arm 21 to move, so that the effector 20 moves to different positions and controls the camera 10 to photograph at each position, where the target object 60 is ensured to be within the field of view of the camera 10 at each position. In addition, when the effector 20 moves to a position, before the camera 10 is controlled to photograph, the camera 10 is first controlled to be calibrated relative to the workbench 40, so that a photograph obtained by the camera 10 has the same effects as that obtained when an optical axis of the camera 10 is perpendicular to the workbench 40, thereby ensuring that z' of the calibrated camera coordinate system 62 is perpendicular to the workbench 40.

First, a first position 71 is set as an original position. In space, the first position 71 corresponds to the point P1 in FIG. 3 at which the end, namely the TCP, of the effector 20 is located. A point, on the workbench 40, to which the point P1 is projected along the z-axis of the theoretical effector coordinate system 61 is the point P3, and a point, on the workbench 40, to which the point P1 is projected along the z"-axis of the actual effector coordinate system 61 is the point P2, as shown in FIG. 3.

Figure 4:
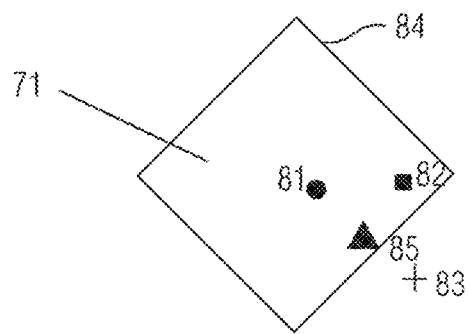
FIG. 4 shows a position of a target object and a position of a camera in a photograph taken when an effector is at a first position, a field of view of the camera, a point P2, and a point P3.
Figure 5:
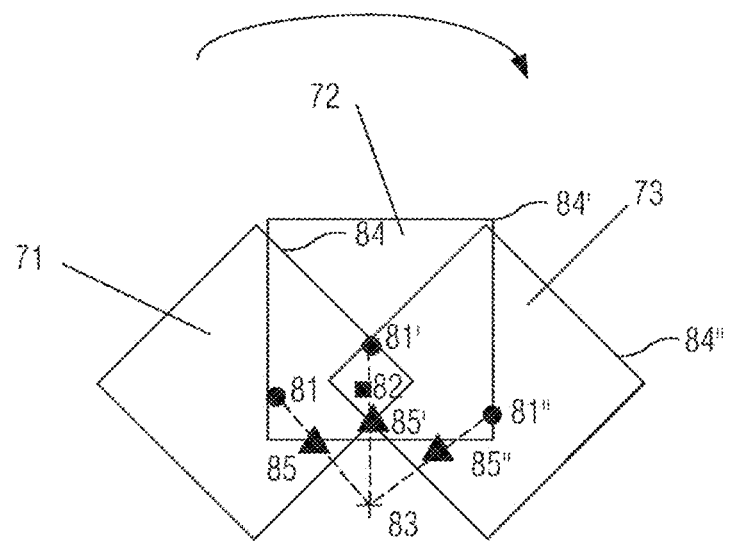
FIG. 5 shows a position of a target object and a position of a camera in a photograph taken when an effector is controlled to rotate and photograph, a field of view of the camera, a point P2, and a point P3.
Figure 6:
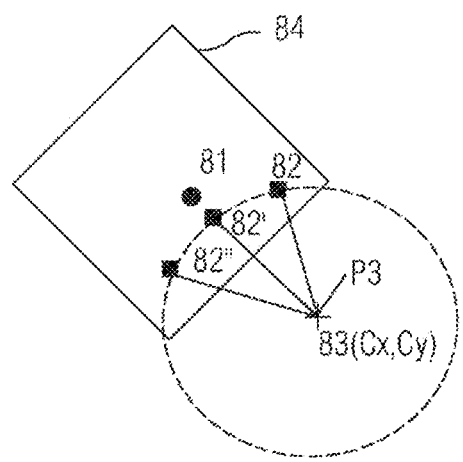
FIG. 6 shows a method for determining a position of a point P3 according to an embodiment of the present invention.

When the effector 20 controls the camera 10 to photograph at the first position 71, the camera 10 in the photograph is at a position 81, the target object 60 in the photograph is at a position 82, the point P2 is at a position 85, and a field of view of the camera 10 is a range 84. Relative to this photograph, the point P3 is at a position 83, as shown in FIG. 4.

Then, the robotic arm 21 is controlled to make the effector 20 rotate to the second position 72 and the third position 73 around the z"-axis of the actual effector 20, and the camera 10 is controlled to separately photograph when the effector 20 rotates to the second position 72 and the third position 73. The target object 60 stays still during the rotation. When the effector 20 moves to the second position 72, the position of the camera 10 in the photograph is changed to a position 81', the field of view of the camera 10 is changed to a range 84', the point P2 is at a position 85' (because the effector 20 rotates around z", the position of the point P2 in space remains unchanged). When the effector 20 moves to the third position 73, the position of the camera 10 in the photograph is changed to a position 81", the field of view of the camera 10 is changed to a range 84", and the point P2 is at a position 85".

Figure 7:
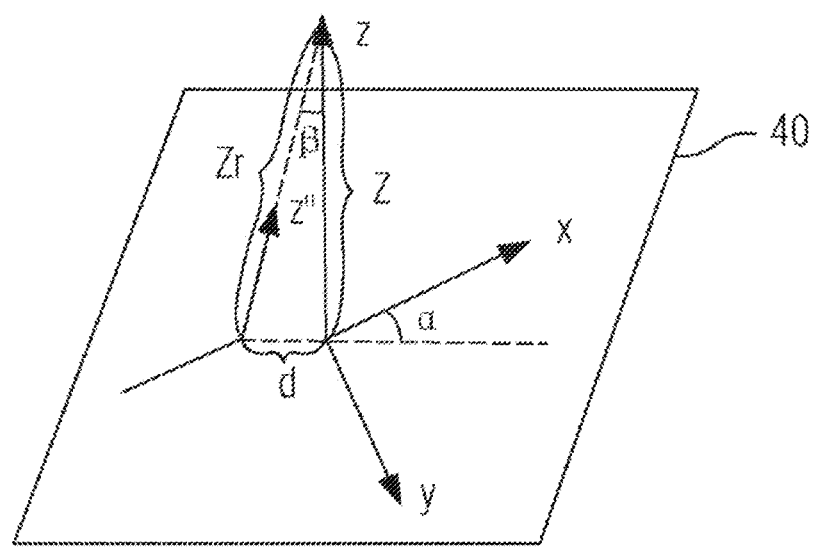
FIG. 7 and FIG. 8 show a method for processing an error according to an embodiment of the present invention.

The positions of the target object 60 in the photographs obtained at the second position 72 and the third position 73 are merged into the photograph obtained at the first position 71. At the first position 71, the second position 72, and the third position 73, the positions of the target object 60 in the photographs are respectively the position 82, a position 82', and a position 82". Before photographing at each position, the camera 10 is controlled to be calibrated relative to the workbench 40, and therefore the camera 10 may be considered as rotating around a straight line passing P3 and perpendicular to the workbench 40. Therefore, in the photograph taken at each position, a distance between the position of the target object 60 in the picture and the point P3 is the same. Therefore, in a photograph with merged positions, the three positions of the target object 60, namely the positions 82, 82', and 82" are all on a circle with P3 as the center, as shown in FIG. 7. Coordinates of the point P3, namely coordinates (Cx, Cy) of the position 83, in the camera coordinate system 62 can be obtained based on coordinates of the positions 82, 82', and 82" in the camera coordinate system 62.

The effector 20 is controlled to move such that the effector 20 moves from the first position 71 along the z"-axis, and the end, namely the TCP, of the effector 20 touches the workbench 40, that is, reaches a fourth position 74. In this case, a point at which the end, namely the TCP, of the effector coordinate system 61 touches the workbench 40 is P2. A distance for which the TCP of the effector 20 moves is h in FIG. 3. Then, the effector 20 is controlled to move such that the effector 20 returns to the first position 71 along the z"-axis and the camera is controlled to photograph. The photograph includes a position of the point P2 on the workbench 40, and coordinates (Cxt, Cyt) of the position in the camera coordinate system 62 are determined. Therefore, d may be obtained according to the following formula (1):

$$\sqrt{(Cxt-Cx)^2+(Cyt-Cy)^2} \qquad \text{Formula (1)}$$

Then, the above-mentioned angle β may be obtained according to the following formula (2):

$$\beta = \arcsin\frac{d}{h} \qquad \text{Formula (2)}$$

Next, the error α is determined.

In this embodiment of the present invention, a is a counter-clockwise angle between the vector $\overrightarrow{P2P3}$ and the x-axis of the theoretical effector coordinate system 61. Based on the above-denoted coordinates (Cxt, Cyt) of P2 in the camera coordinate system 62, according to the known transformation relationship between the theoretical effector coordinate system 61 and the camera coordinate system 62, coordinates (Txr, Tyr, Tzr) of P2 in the theoretical effector coordinate system 61 can be obtained. Because P3 is a point at which the TCP point of the effector 20 is projected along the z-axis of the theoretical effector coordinate system 61 onto the plane of the workbench 40 when the effector is at the first position 71, coordinates of P3 in the theoretical effector coordinate system 61 are (0, 0, Tzr). Therefore, the angle α can be obtained via calculation according to the following formula (3):

$$\alpha = \arctan\frac{Tyr}{Txr} \qquad \text{Formula (3)}$$

How to determine the errors α and β is described above. After the errors α and β are obtained, for how to control the robotic arm 21 to operate, that is, how to make the robotic arm operate accurately on the workbench 40, for example, grab the target object 60 placed on the workbench 40, when the z"-axis of the actual effector coordinate system 63 is not perpendicular to the workbench 40, the following processing of the errors is required.

Figure 8:
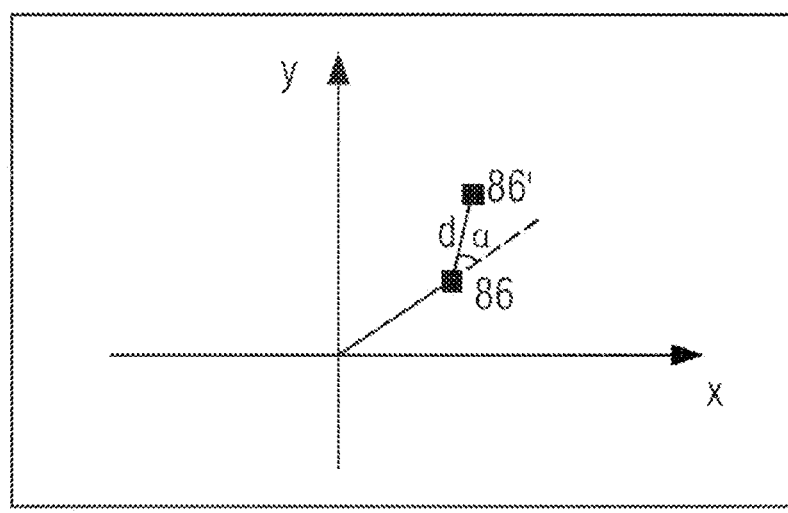

Specifically, the two parameters α and β are used as internal parameters of the robotic arm 21. For example: if the camera 10 calculates coordinates of a grabbing position in the camera coordinate system 62, and transforms the coordinates into coordinates (X, Y, Z) in the theoretical effector coordinate system 61 according to the known transformation relationship between the camera coordinate system 62 and the theoretical effector coordinate system 61. In this case, in a real grabbing position (Xr, Yr, Zr), Zr can be obtained via calculation according to the following formula (4) (as shown in FIG. 8):

$$Zr = \frac{z}{\cotan\beta} \qquad \text{Formula (4)}$$

Figure 9:
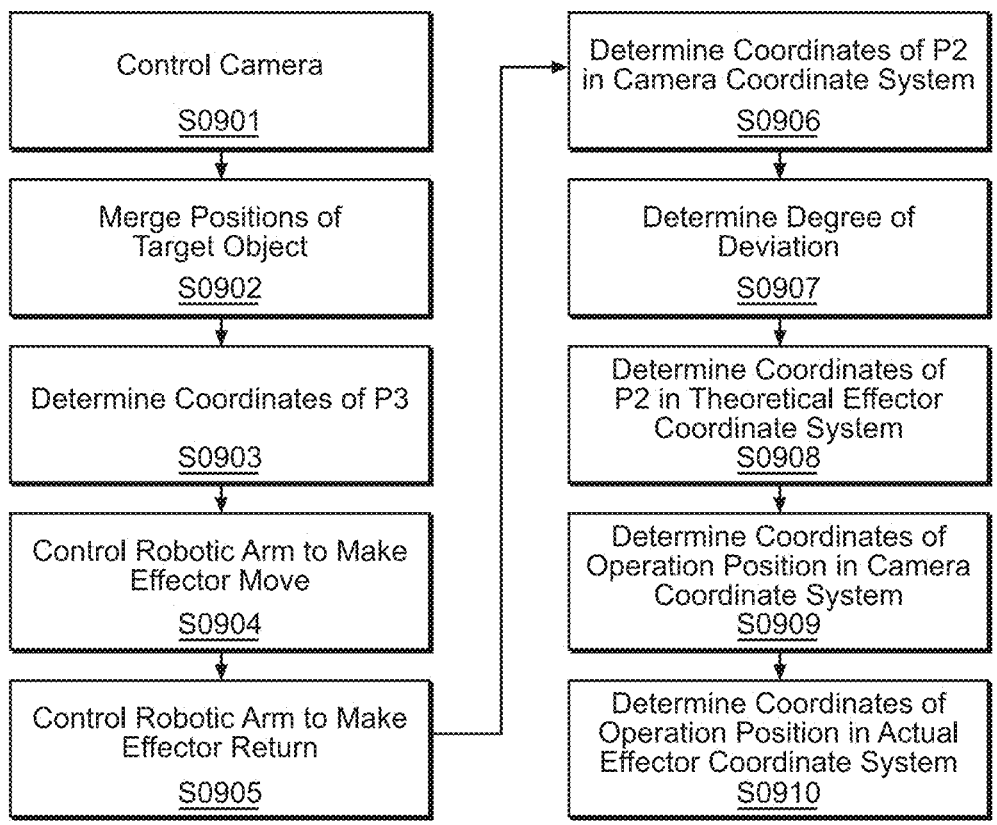
FIG. 9 is a flowchart of a method for calibrating a coordinate system according to an embodiment of the present invention.

As shown in FIG. 9, a theoretical position of the target object 60 is a position 86, an actual position of the target object 60 is the position 86' due to an error, and then Xr and Yr can be obtained via calculation according to the following formula (5) and formula (6) respectively:

$$Xr = X - d \cdot \sin\alpha \qquad \text{Formula (5)}$$

$$Yr = Y - d \cdot \cos\alpha \qquad \text{Formula (6)}$$

The foregoing process is summarized as shown in FIG. 9. An embodiment of the present invention provides a method for calibrating a coordinate system, and the method can be used to determine an error caused by non-perpendicularity of a z-axis of an actual effector coordinate system to a workbench. As shown in FIG. 9, the method may include the following steps:

S901: when an effector 20 fixedly connected to a robotic arm 21 is at a first position 71, a second position 72, and a third position 73, separately controlling a camera 10 fixedly connected to the effector 20 to photograph a target object 60 placed on a workbench 40 operated by the robotic arm 21, where the second position 72 and the third position 73 are two positions to which the effector 20 rotates, from the first position 71, around a z"-axis of an actual effector coordinate system 63;

S902: merging positions of the target object 60 in photographs taken when the effector 20 is at the second position 72 and the third position 73 into a photograph taken when the effector 20 is at the first position 71;

S903: determining coordinates, in a camera coordinate system 62, of the center P3 of a circle in which the three positions of the target object 60 in the photograph with the merged positions are located;

S904: controlling the robotic arm 21 to make the effector 20 move along the z"-axis until the end of the effector 20 touches the workbench 40, and marking a point at which the effector 20 touches the workbench 40 as a point P2;

S905: controlling the robotic arm 21 to make the effector 20 return to the first position 71 along the z"-axis and controlling the camera 10 to photograph;

S906: determining coordinates of P2 in the camera coordinate system 62 based on a position of P2 in a photograph;

S907: determining a degree of deviation of the z"-axis from a z-axis of a theoretical effector coordinate system 61 based on the coordinates of P2 and P3 in the camera coordinate system 62 and a distance for which the effector 20 moves from the first position 71 along the z"-axis;

S908: determining coordinates of P2 in the theoretical effector coordinate system 61, and obtaining a deviation direction of the z"-axis via calculation based on the determined coordinates;

S909: determining coordinates of an operation position in the camera coordinate system 62, and transforming the coordinates of the operation position in the camera coordinate system 62 into coordinates in the theoretical effector coordinate system 61; and S910: determining coordinates of the operation position in the actual effector coordinate system 63 based on the degree of deviation of the z"-axis from the z-axis, the deviation direction of the z"-axis, and the coordinates of the operation position in the theoretical effector coordinate system 61.

For other optional implementations of the method, reference may be made to FIG. 2 to FIG. 8 and the corresponding descriptions, and details are not described herein again. For steps S909 and S910, when an error is known, the method can be implemented independently of the foregoing steps S901 to S908.

Figure 10:
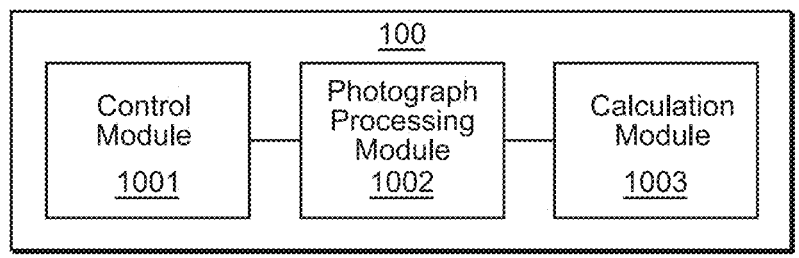
FIG. 10 is a schematic structural diagram of an apparatus for calibrating a coordinate system according to an embodiment of the present invention.

As shown in FIG. 10, an embodiment of the present invention further provides an apparatus 100 for calibrating a coordinate system, the apparatus including:

a control module 1001 configured to: when an effector 20 fixedly connected to a robotic arm 21 is at a first position 71, a second position 72, and a third position 73, separately control a camera 10 fixedly connected to the effector 20 to photograph a target object 60 placed on a workbench 40 operated by the robotic arm 21, where the second position 72 and the third position 73 are two positions to which the effector 20 rotates, from the first position 71, around a z"-axis of an actual effector coordinate system 63;

a photograph processing module 1002 configured to: merge positions of the target object 60 in photographs taken when the effector 20 is at the second position 72 and the third position 73 into a photograph taken when the effector 20 is at the first position 71;

a calculation module 1003 configured to: determine coordinates, in a camera coordinate system 62, of the center P3 of a circle in which the three positions of the target object 60 in the photograph with the merged positions are located;

the control module 1001 further configured to: control the robotic arm 21 to make the effector 20 move along the z"-axis until the end of the effector 20 touches the workbench 40, mark a point at which the effector 20 touches the workbench 40 as a point P2, and control the robotic arm 21 to make the effector 20 return to the first position 71 along the z"-axis and control the camera 10 to photograph; and the calculation module 1003 further configured to: determine coordinates of P2 in the camera coordinate system 62 based on a position of P2 in a photograph, and determine a degree of deviation of the z"-axis from a z-axis of a theoretical effector coordinate system 61 based on the coordinates of P2 and P3 in the camera coordinate system 62 and a distance for which the effector 20 moves from the first position 71 along the z"-axis.

Optionally, the calculation module 1003 is further configured to: determine coordinates of P2 in the theoretical effector coordinate system 61; and obtain a deviation direction of the z"-axis via calculation based on the determined coordinates.

Optionally, the calculation module 1003 is further configured to: determine coordinates of an operation position in the camera coordinate system 62; transform the coordinates of the operation position in the camera coordinate system 62 into coordinates in the theoretical effector coordinate system 61; and determine coordinates of the operation position in the actual effector coordinate system 63 based on the degree of deviation of the z"-axis from the z-axis, the deviation direction of the z"-axis, and the coordinates of the operation position in the theoretical effector coordinate system 61.

For other optional implementations of the apparatus 100, reference may be made to FIG. 2 to FIG. 8 and corresponding descriptions, where the control module 1001 is configured to move a robotic arm, control a camera to photograph, and the like. The photograph processing module 1002 is configured to process a picture taken by the camera. The calculation module 1003 is configured to calculate an error and the like. When an error is known, the calculation module 1003 may implement the solution for determining coordinates of an operation position in the actual effector coordinate system 63, independently of the solution for determining an error.

Figure 11:
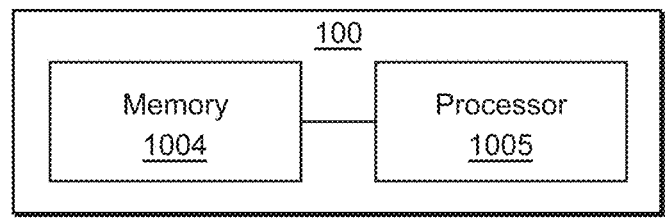
FIG. 11 is another schematic structural diagram of an apparatus for calibrating a coordinate system according to an embodiment of the present invention.

FIG. 11 is another schematic structural diagram of an apparatus 100 for calibrating a coordinate system according to an embodiment of the present invention. As shown in FIG. 11, with this structure, the apparatus 100 for calibrating a coordinate system may include at least one memory 1004 configured to store computer-readable code; and at least one processor 1005 configured to execute the computer-readable code stored in the at least one memory 1004 to perform the foregoing method for calibrating a coordinate system. Various modules shown in FIG. 10 may be considered as program modules written with the computer-readable code stored in the memory 1004. When the program modules are invoked by the processor 1005, the foregoing method for calibrating a coordinate system can be performed.

In addition, the various modules may alternatively be considered as various functional modules implemented by a combination of hardware and software, and various functions involved when the apparatus 100 for calibrating a coordinate system performs the method for calibrating a coordinate system. The various modules may alternatively be considered as various functional modules implemented by hardware, configured to implement various functions involved when the apparatus 100 for calibrating a coordinate system performs the method for calibrating a coordinate system. For example, control logic of various procedures in the method is burnt in advance to, for example, a field-programmable gate array (FPGA) chip or a complex programmable logic device (CPLD), and the chip or device performs the functions of the various modules. A specific implementation is determined according to engineering practice.

In specific implementation, the apparatus 100 for calibrating a coordinate system may be implemented as a part of functions of the teach pendant 50. The robotic arm 21 is controlled to move and the camera 10 is controlled to photograph based on functions implemented by the teach pendant 50. The teach pendant 50 may also be used for operations such as parameter calculation with a current processing capacity.

In addition, an embodiment of the present invention further provides a computer-readable medium, where the computer-readable medium stores computer-readable instructions that, when executed by a processor, cause the processor to perform the foregoing method for calibrating a coordinate system. Embodiments of the computer-readable medium include a floppy disk, a hard disk, a magnetic optical disc, an optical disc (such as CD-ROM, CD-R, CD-RW, DVD-ROM, DVD-RAM, DVD-RW and DVD+RW), a magnetic tape, a non-volatile memory card, and a ROM. Optionally, the computer-readable instructions may be downloaded from a server computer or a cloud via a communications network.

It should be noted that not all the steps and modules in the procedures and system structural diagrams described above are necessary, and some steps or modules may be omitted according to practical requirements. The execution order of the various steps is not fixed and may be adjusted according to requirements. The system structure described in the various embodiments above may be a physical structure, or may be a logical structure. In other words, some modules may be implemented by a same physical entity, or some modules may be implemented separately by a plurality of physical entities, or may be implemented jointly by some components in a plurality of independent devices.

The invention claimed is:

1. A method for calibrating a coordinate system, comprising:

separately controlling a camera, fixedly connected to an effector which is fixedly connected to a robotic arm, to photograph a target object, placed on a workbench operated by the robotic arm, upon the effector being at each of a first position, a second position, and a third position, the second position and the third position being two positions at which the effector is rotatable from the first position, around a z"-axis of an actual effector coordinate system;

merging positions of the target object in photographs taken when the effector is at the second position and the third position into a photograph taken when the effector is at the first position, to produce a merged photograph;
determining coordinates, in a camera coordinate system, of a center P3 of a circle in which the first position, second position and third position of the target object in the merged photograph are located;
controlling the robotic arm to make the effector move along the z"-axis until an end of the effector touches the workbench, and marking a point at which the effector touches the workbench as a point P2;
controlling the robotic arm to make the effector return to the first position along the z"-axis and controlling the camera to photograph;
determining coordinates of P2 in the camera coordinate system based on a position of P2 in the photograph; and
determining a degree of deviation of the z"-axis from a z-axis of a theoretical effector coordinate system based on the coordinates of P2 and P3 in the camera coordinate system and a distance corresponding to the effector movement from the first position along the z"-axis.

2. The method of claim 1, further comprising:
determining coordinates of P2 in the theoretical effector coordinate system; and
obtaining a deviation direction of the z"-axis via a calculation based on the coordinates determined.

3. The method of claim 2, further comprising:
determining of the coordinates of an operation position in the camera coordinate system;
transforming the coordinates of the operation position in the camera coordinate system into coordinates in the theoretical effector coordinate system; and
determining coordinates of the operation position in the actual effector coordinate system based on a degree of deviation of the z"-axis from the z-axis, a deviation direction of the z"-axis, and the coordinates of the operation position in the theoretical effector coordinate system.

4. A non-transitory computer-readable medium, storing computer-readable instructions that, when executed by at least one processor, cause the at least one processor to perform at least:
separately controlling a camera, fixedly connected to an effector which is fixedly connected to a robotic arm, to photograph a target object, placed on a workbench operated by the robotic arm, upon the effector being at each of a first position, a second position, and a third position, the second position and the third position being two positions at which the effector is rotatable from the first position, around a z"-axis of an actual effector coordinate system;
merging positions of the target object in photographs, taken when the effector is at the second position and the third position, into a photograph taken when the effector is at the first position, to produce, to produce a photograph with the merged positions;
determining coordinates, in a camera coordinate system, of the center P3 of a circle in which the first position, the second position and the third position of the target object in the photograph with the merged positions are located;
controlling the robotic arm to make the effector move along the z"-axis until an end of the effector touches the workbench, and marking a point at which the effector touches the workbench as a point P2;
controlling the robotic arm to make the effector return to the first position along the z"-axis and controlling the camera to photograph;
determining coordinates of P2 in the camera coordinate system based on a position of P2 in a photograph; and
determining a degree of deviation of the z"-axis from a z-axis of a theoretical effector coordinate system based on the coordinates of P2 and P3 in the camera coordinate system and a distance corresponding to movement of the effector from the first position along the z"-axis.

5. The non-transitory computer readable medium of claim 4, wherein the computer-readable instructions, when executed by the at least one processor, further cause the at least one processor to perform:
determining coordinates of P2 in the theoretical effector coordinate system; and
obtaining a deviation direction of the z"-axis by way of calculation based on the determined coordinates.

6. The non-transitory computer readable medium of claim 5, wherein the computer-readable instructions, when executed by the at least one processor, further cause the at least one processor to perform:
determining coordinates of an operation position in the camera coordinate system;
transforming the coordinates of the operation position in the camera coordinate system into coordinates in the theoretical effector coordinate system; and
determining coordinates of the operation position in the actual effector coordinate system based on a degree of deviation of the z"-axis from the z-axis, a deviation direction of the z"-axis, and the coordinates of the operation position in the theoretical effector coordinate system.

7. An apparatus for calibrating a coordinate system, comprising:
at least one memory configured to store computer-readable code; and
at least one processor configured to invoke the computer-readable code to perform at least:
separately controlling a camera, fixedly connected to an effector which is fixedly connected to a robotic arm, to photograph a target object, placed on a workbench operated by the robotic arm, upon the effector being at each of a first position, a second position, and a third position, the second position and the third position being two positions to which the effector is rotatable from the first position, around a z"-axis of an actual effector coordinate system;
merging positions of the target object in photographs, taken when the effector is at the second position and the third position into a photograph taken when the effector is at the first position, to produce a photograph with the merged positions;
determining coordinates, in a camera coordinate system, of a center P3 of a circle in which the first position, second position and third position of the target object in the photograph with the merged positions are located;
controlling the robotic arm to make the effector move along the z"-axis until an end of the effector touches the workbench, mark a point at which the effector touches the workbench as a point P2, and control the robotic arm to make the effector return to the first position along the z"-axis and control the camera to photograph;
determining coordinates of P2 in the camera coordinate system based on a position of P2 in the photograph; and
determining a degree of deviation of the z"-axis from a z-axis of a theoretical effector coordinate system based on the coordinates of P2 and P3 in the camera coordinate system and a distance corresponding to movement of the effector from the first position along the z"-axis.

8. The apparatus of claim 7, wherein the at least one processor is further configured to perform:
   determining coordinates of P2 in the theoretical effector coordinate system; and
   obtaining a deviation direction of the z"-axis by way of calculation based on the coordinates determined.

9. The apparatus of claim 8, wherein the at least one processor is further configured to perform:
   determining of coordinates of an operation position in the camera coordinate system;
   transforming the coordinates of the operation position in the camera coordinate system into coordinates in the theoretical effector coordinate system; and
   determining coordinates of the operation position in the actual effector coordinate system based on a degree of deviation of the z"-axis from the z-axis, a deviation direction of the z"-axis, and the coordinates of the operation position in the theoretical effector coordinate system.

\* \* \* \* \*